(12) United States Patent
Neumann et al.

(10) Patent No.: US 12,088,168 B2
(45) Date of Patent: Sep. 10, 2024

(54) METHOD OF CONTROLLING A PLANAR DRIVE SYSTEM AND PLANAR DRIVE SYSTEM

(71) Applicant: Beckhoff Automation GmbH, Verl (DE)

(72) Inventors: Klaus Neumann, Gütersloh (DE); Lukas Bentfeld, Delbrück (DE); Keir Maguire, North Vancouver (CA); Tim Kaulmann, Paderborn (DE); Benjamin Jurke, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 245 days.

(21) Appl. No.: 17/900,339

(22) Filed: Aug. 31, 2022

(65) Prior Publication Data

US 2023/0006530 A1    Jan. 5, 2023

Related U.S. Application Data

(63) Continuation of application No. PCT/EP2021/058472, filed on Mar. 31, 2021.

(30) Foreign Application Priority Data

Apr. 2, 2020   (EP) .................................... 20167764

(51) Int. Cl.
  *H02K 41/03*    (2006.01)
  *H02K 11/215*   (2016.01)
  *H02P 23/00*    (2016.01)

(52) U.S. Cl.
  CPC ......... *H02K 41/031* (2013.01); *H02K 11/215* (2016.01); *H02P 23/0018* (2013.01); *H02K 2213/03* (2013.01)

(58) Field of Classification Search
  CPC ............... H02K 11/215; H02K 41/031; H02K 2213/03; H02K 2201/18; H02P 23/0018; G01D 5/145
  See application file for complete search history.

(56) References Cited

U.S. PATENT DOCUMENTS 10,008,915 B2   6/2018   Lu et al.
10,056,816 B2   8/2018   Lu
(Continued)

FOREIGN PATENT DOCUMENTS

DE   102015203686 A1   9/2016
DE   102017131314 A1   6/2019
(Continued)

OTHER PUBLICATIONS

International Preliminary Report on Patentability dated Feb. 2, 2022 in connection with International Patent Application No. PCT/EP2021/058472, 31 pages including translation.
(Continued)

*Primary Examiner* — Said Bouziane
(74) *Attorney, Agent, or Firm* — Dorsey & Whitney LLP

(57) ABSTRACT

A method for controlling a planar drive system includes generating a position allocating function, in an allocation generating step; measuring a plurality of measuring values of the magnetic rotor field by magnetic field sensors for a position of the rotor relative to the stator module, in a magnetic rotor field determining step; applying the position determination function to the plurality of measuring values of the magnetic rotor field of the plurality of magnetic field sensors, in a measuring value analysis step; and determining the position of the rotor relative to the stator module on the basis of the measurements of the magnetic rotor field measured by the plurality of magnetic field sensors and based on the allocations of the position allocating function,
(Continued)

in a position determining step. The application further relates to such a planar drive system.

12 Claims, 7 Drawing Sheets

(56) References Cited

U.S. PATENT DOCUMENTS

| | | |
|---|---|---|
| 10,116,195 B2 | 10/2018 | Lu |
| 10,222,237 B2 | 3/2019 | Lu |
| 10,348,177 B2 | 7/2019 | Lu |
| 10,763,733 B2 | 9/2020 | Lu |
| 11,489,428 B2 | 11/2022 | Brinkmann et al. |
| 2009/0243598 A1 | 10/2009 | Oday |
| 2014/0204358 A1 | 7/2014 | Yang et al. |
| 2015/0028098 A1 | 1/2015 | Kleinikkink et al. |
| 2016/0086080 A1 | 3/2016 | Foong et al. |
| 2018/0241296 A1* | 8/2018 | Glöss .................. H02K 41/031 |

FOREIGN PATENT DOCUMENTS

| | | |
|---|---|---|
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017004716 A1 | 1/2017 |

OTHER PUBLICATIONS

International Search Report and Written Opinion dated Jun. 2, 2021 in connection with International Patent Application No. PCT/EP2021/058472, 17 pages including translation.

Extended European Search Report dated Sep. 17, 2020 in European patent application No. 20 167 764.8, 14 bages including translation.

Office Action dated Aug. 21, 2023 in connection with Chinese patent application No. 202180025458.0, 8 pages Including English translation.

* cited by examiner

METHOD OF CONTROLLING A PLANAR DRIVE SYSTEM AND PLANAR DRIVE SYSTEM

CROSS-REFERENCE TO RELATED APPLICATIONS

This is a continuation of International Patent Application No. PCT/EP2021/058472, "Method of Controlling a Planar Drive System and Planar Drive System," filed Mar. 31, 2021, which claims priority to European patent application EP 20 167 764.8, "Verfahren zum Steuern eines Planarantriebssystems and Planarantriebssystem," filed Apr. 2, 2020, the contents of each of which are incorporated by reference herein, in the entirety and for all purposes.

The present application relates to a method of controlling a planar drive system, and to a planar drive system set up to perform the method of controlling a planar drive system.

TECHNICAL FIELD

Planar drive systems may inter alia be used in automation technology, in particular manufacturing technology, handling technology and process engineering. Planar drive systems may be used to move or position a moving element of a system or machine in at least two linearly independent directions. Planar drive systems may comprise a permanently energized electromagnetic planar motor with a planar stator and a rotor movable on the stator in at least two directions.

In a permanently energized electromagnetic planar motor, a driving force is exerted on the rotor by current-carrying conductors magnetically interacting with drive magnets of a magnet arrangement. The application in particular relates to embodiments of planar drive systems in which the drive magnets of an electric planar motor are arranged on the rotor and the current-carrying conductors of the planar motor are arranged in a stationary planar stator.

In such a drive system, the rotor comprises at least a first magnetic unit for driving the rotor in a first direction and a second magnetic unit for driving the rotor in a second direction linearly independent of the first direction, e.g. in a direction orthogonal to the first direction. The planar stator comprises at least a group of first energizable conductors magnetically interacting with the magnets of the first magnet unit to drive the rotor in the first direction, as well as a group of second energizable conductors magnetically interacting with the magnets of the second magnet unit to drive the rotor in the second direction. The first and second groups of conductors may generally be energized independently of each other to allow independent movement of the rotor in the first and second directions. If the conductors of the first and second groups themselves may be energized independently of each other at least in parts, a plurality of rotors may be moved independently of one another on one stator at the same time.

Documents WO 2013/059934 A1, WO 2015/017933 A1, WO 2015/179962 A1, WO 2015/184553 A1, WO 2015/188281 A1, WO 2017/004716 A1 each describe planar drive systems (displacement devices) comprising an electromagnetic planar motor with a permanently energized rotor and a stator comprising a plurality of current-carrying conductors.

In order to control a rotor of a planar drive system, it is essential to be able to determine a position of the rotor relative to the stator module or stator modules of the planar drive system. For this purpose, each stator module comprises at least a sensor module with a plurality of magnetic field sensors that are set up to detect the magnetic field of the rotor, which makes it possible to determine the position of the rotor relative to the respective sensor module or relative to the respective stator module. The more precisely a position of the rotor may be determined in such a way, the more precisely the planar drive system may be controlled.

SUMMARY

A method for controlling a planar drive system is provided, which enables improved and more precise control of a rotor due to improved position determination of the rotor. Further a planar drive system which is set up to carry out the method according to the application is provided.

EXAMPLES

A method for controlling a planar drive system is provided, the planar drive system comprising at least a control unit, a stator module and a rotor, the stator module being configured to generate magnetic stator fields for electrically controlling the rotor, the rotor comprising a magnet arrangement for generating a magnetic rotor field, wherein a magnetic coupling between the rotor and the stator module may be achieved via the magnetic stator fields and the magnetic rotor field, wherein the stator module comprises a sensor module with a plurality of magnetic field sensors for determining a position of the rotor, wherein the magnetic field sensors are arranged in a two-dimensional array on the stator module, and wherein each magnetic field sensor is set up to determine the magnetic rotor field for a spatial area in the two-dimensional array, comprising:

generating a position allocating function in an allocation generating step, wherein the position allocating function is configured to allocate a position of the rotor relative to the stator module to a plurality of measuring values of the magnetic rotor field 402 of a plurality of magnetic field sensors 501 of the sensor module 500;

measuring a plurality of measuring values of the magnetic rotor field by magnetic field sensors for a position of the rotor relative to the stator module in a magnetic rotor field determining step;

applying the position allocating function to the plurality of measuring values of the magnetic rotor field of the magnetic field sensors in a measuring value analysis step; and determining the position of the rotor relative to the stator module by the position allocating function in a position determining step.

This achieves the technical advantage of providing an efficient and effective method of controlling a planar drive system in which precise positioning of the rotor relative to the stator module may be effected.

The position allocating function may be used to generate allocations between a position of the rotor relative to the stator module and measuring values of the magnetic rotor field measured by a plurality of the magnetic field sensors of the sensor module of the stator module for the respective position of the rotor relative to the stator module. The allocations between the positions of the rotor relative to the stator module and the measuring values of the magnetic rotor field measured for the respective position by a plurality of magnetic field sensors of the sensor module may be used to unambiguously determine which measuring values of the magnetic rotor field a particular plurality of magnetic field sensors of the sensor module will measure for a particular position of the rotor relative to the stator module.

Conversely, a position of the rotor relative to the stator module may be determined for a plurality of measuring values of the magnetic rotor field measured by corresponding magnetic field sensors of the sensor module. By taking respective measurements of a plurality of measuring values of the magnetic rotor field by selected magnetic field sensors of the sensor module and by applying the position allocating function to the measuring values of the magnetic rotor field measured by the plurality of magnetic field sensors, a position of the rotor relative to the stator module may be allocated to the measuring values of the rotor module by the position allocating function at the stator module, taking into account the arrangement of the respective magnetic field sensors by which the plurality of measuring values are measured. In this way, a precise position determination may be achieved on the basis of a plurality of measuring values of the respective magnetic rotor field.

Within the framework of the application, an allocation is a unique relationship between a position of the rotor relative to the stator module and measuring values of the magnetic rotor field detected by a plurality of magnetic field sensors of the sensor module. The plurality of magnetic field sensors may comprise all of the magnetic field sensors of the sensor module. Alternatively, the plurality may comprise a subset of the total number of magnetic field sensors of the sensor module. In particular, for different positions of the rotor relative to the stator module, different magnetic field sensors may be comprised in the plurality of magnetic field sensors that take readings of the magnetic rotor field.

For the purposes of the application, the position allocating function is a module that comprises or generates allocations between positions of the rotor relative to the stator module and measuring values of the magnetic rotor field of a corresponding plurality of magnetic field sensors. The position allocating function may be an appropriately trained artificial neural network.

Alternatively, the position allocating function may be a mathematical function in which corresponding allocations are integrated and which is set up to allocate corresponding positions of the magnetic rotor field to measuring values of the magnetic rotor field according to the measuring value analysis step.

For the purpose of the application, a magnetic field sensor is a Hall sensor and may in particular be embodied as a one-dimensional, two-dimensional or three-dimensional Hall sensor.

For the purpose of the application, a measuring value of the magnetic rotor field is a measuring value of a one-dimensional, two-dimensional or three-dimensional Hall sensor and accordingly may be a one-dimensional, two-dimensional or three-dimensional value of the magnetic rotor field and may comprise components of the magnetic rotor field with respect to one, two or three spatial directions.

According to an embodiment, the allocation generating step comprises:
  measuring a plurality of measuring values of the magnetic rotor field by a magnetic field measuring arrangement in a magnetic rotor field measuring step, wherein a three-dimensional measurement of the magnetic rotor field is determined by the plurality of measuring values of the magnetic rotor field;
  determining, based on the three-dimensional measurement of the magnetic rotor field, a plurality of values of the magnetic rotor field for a plurality of magnetic field sensors of the sensor module for a plurality of positions of the rotor relative to the stator module in a sensor value determining step, wherein for each of the plurality of positions of the rotor relative to the stator module, a value of the magnetic rotor field is allocated to each magnetic field sensor of the plurality of magnetic field sensors of the sensor module according to the three-dimensional measurement of the magnetic rotor field; and
  determining a plurality of allocations on the basis of the plurality of values of the magnetic rotor field for a plurality of magnetic field sensors of the sensor module and the plurality of positions of the rotor in an allocation-determining step.

This achieves the technical advantage that a precise position determination of the rotor relative to the stator module is achieved. By measuring the plurality of measuring values of the magnetic rotor field in the magnetic rotor field measuring step, a three-dimensional measurement of the magnetic rotor field may be achieved. As a result, a precise three-dimensional determination of the magnetic rotor field may be achieved. On the basis of the precise knowledge of the magnetic rotor field, a prediction of values of the magnetic rotor field to be expected for a certain position of the rotor relative to the stator module in spatial areas of the magnetic field sensors of the sensor module is possible.

Based on the knowledge of the position of each individual magnetic field sensor within the stator module and the knowledge of the three-dimensional configuration of the magnetic rotor field, precisely one value of the magnetic rotor field may be predicted exactly for a certain position of the rotor relative to the stator module for each spatial area of a magnetic field sensor of the sensor module. This allows a precise allocation between positions of the rotor relative to the stator module and measuring values of the magnetic rotor field to be measured by the respective magnetic field sensors of the sensor module by the position allocating function. The more precise the knowledge of the three-dimensional configuration of the magnetic rotor field determined by corresponding measurements in the magnetic rotor field determining step, the more precise the prediction of the values of the magnetic rotor field to be measured for specific positions of the rotor relative to the stator module by the respective magnetic field sensors of the sensor module. As a result, a more precise determination of the position of the rotor relative to the stator module may be achieved. A more precise determination of the position of the rotor may in turn lead to improved and, in particular, more precise control of the planar drive system.

Due to the three-dimensional measurement of the magnetic rotor field by the magnetic field measuring arrangement, the determination of the magnetic rotor field may be determined individually for each rotor of the planar drive system. This allows production-related deviations of the magnetic rotor field for various rotors of the planar drive system to be taken into account. This allows for a more precise prediction of the values of the respective magnetic rotor fields to be expected for certain positions of the individual rotors for the respective magnetic field sensors. This in turn allows for a more precise determination of the position and thus a more precise and accurate control of the rotors of the planar drive system.

In addition, the three-dimensional measurement of the magnetic rotor fields of the individual rotors of the planar drive system may be performed prior to operating the planar drive system. As a result, a trouble-free initialization phase of the planar drive system may be achieved, in which, due to the detailed knowledge of the individual magnetic rotor fields of the respective rotors of the planar drive system, a precise position determination of individual rotors and, associated with this, a precise control of individual rotors of the planar drive system may already be achieved in the initialization phase of the planar drive system.

According to an embodiment, in the magnetic rotor field measuring step, the three-dimensional measurement of the magnetic rotor field is implemented by a three-dimensional array of discrete measurement points of the magnetic rotor field.

This has the technical advantage that a simple and precise determination of the magnetic rotor field of the rotor may be achieved. The three-dimensional array of discrete measuring points may be realized as a three-dimensional grid of measuring points of the magnetic rotor field. At each grid point or measuring point of the three-dimensional array, different measuring values of the magnetic rotor field may be recorded by corresponding measurements of magnetic field sensors arranged at the respective measuring points.

This allows measuring values of the magnetic rotor field to be recorded for various three-dimensionally arranged points in space. This allows for a three-dimensional measurement of the magnetic rotor field and thus for knowledge of the three-dimensional configuration of the respective magnetic rotor field. By a number of measuring points of the three-dimensional array of discrete measuring points, a precision of the three-dimensional measurement of the magnetic rotor field may be varied. This allows for a high flexibility in determining the magnetic rotor field by realizing a high density of measuring points in characteristic areas of the magnetic rotor field and a low density of measuring points in less characteristic areas of the magnetic rotor field. As a result, a three-dimensional measurement of the magnetic rotor field may be made more precise and accelerated at the same time.

According to an embodiment, the magnetic field measuring arrangement may be moved in three spatial dimensions and comprises a single magnetic field sensor and/or a one-dimensional magnetic field sensor arrangement and/or a two-dimensional magnetic field sensor arrangement and/or a three-dimensional magnetic field sensor arrangement, wherein the three-dimensional array of discrete measuring points is realized by measurements of the magnetic field sensors of the magnetic field sensor arrangement movable in three spatial dimensions.

This achieves the technical advantage that a precise three-dimensional measurement of the magnetic rotor field may be realized. The magnetic field measuring arrangement, which comprises a plurality of magnetic field sensor units and may be moved in three spatial dimensions, may be used to realize any three-dimensional array of discrete measuring points. With the magnetic field measuring arrangement that may be moved in three spatial dimensions, individual magnetic field sensor units of the magnetic field measuring arrangement may be positioned at any spatial points relative to the rotor to be measured, so that measuring values of the corresponding magnetic rotor field may be recorded for any spatial points relative to the respective rotor. By moving in three spatial dimensions of the magnetic field measuring arrangement, it is thus possible to achieve an arbitrarily accurate three-dimensional measurement of the magnetic rotor field. In particular, an individual three-dimensional measurement of the respective magnetic rotor field may be realized for each rotor to be measured. This allows increased flexibility in measuring the magnetic rotor fields of the rotors of the planar drive system, wherein production-related irregularities of the individual rotors may be taken into account.

In addition, the magnetic field measuring arrangement, which may be moved in three spatial dimensions, may allow for an identical three-dimensional array of discrete measuring points to be realized for each rotor of the magnetic rotor field, so that increased comparability of the three-dimensional measurements of different magnetic rotor fields of different rotors may be achieved in this way. For each rotor, measuring values of the respective magnetic rotor field are thus recorded at the same spatial points relative to the respective rotor. This allows for simplified processing of the respective three-dimensional measurements of different magnetic rotor fields of different rotors, in particular when determining the plurality of values of the magnetic rotor field for the respective plurality of magnetic field sensors in the sensor value determining step.

In addition, the magnetic field measuring arrangement, which may be moved in three spatial dimensions, allows for increased reproducibility of the three-dimensional measurement of the magnetic rotor fields of different rotors. This allows for increased comparability of different three-dimensional measurements of different magnetic rotor fields. This in turn allows for a more precise determination of the expected measurement values of the magnetic rotor field in the sensor value determining step, which in turn leads to a more precise position determination of the individual rotors of the planar drive system and thus to a more accurate control of the planar drive system.

According to an embodiment, the three-dimensional measurement of the magnetic rotor field comprises a model description of the three-dimensional array of discrete measurement points, wherein the model description comprises an interpolation of the three-dimensional array of discrete measurement points.

This has the technical advantage that a precise three-dimensional measurement of the magnetic rotor field and, associated with this, a precise determination of the three-dimensional configuration of the magnetic rotor field may be achieved. By interpolating the three-dimensional array of discrete measuring points or the measuring values of the magnetic rotor field to be measured recorded at the respective measuring points, values of the magnetic rotor field may be determined for any spatial points relative to the respective rotor, in particular for spatial points which were not taken into account in the three-dimensional measurement by the three-dimensional array of discrete measuring points. This increases a precision of the knowledge of the three-dimensional configuration of the magnetic rotor field to be measured. The increased knowledge of the three-dimensional configuration of the magnetic rotor field increases the determination of the values of the magnetic rotor field to be expected for the individual magnetic field sensors in the sensor value determining step. This increases a precision of the allocation of the position allocating function. This in turn contributes to a more precise position determination of the rotor and, consequently, to a more accurate control of the rotor and of the planar drive system, respectively.

According to an embodiment, the magnetic rotor field determining step comprises:
  selecting the plurality of magnetic field sensors from the magnetic field sensors of the sensor module for determining the magnetic rotor field in a magnetic field sensor selecting step, wherein the determination of the magnetic rotor field is limited to measuring values of the selected magnetic field sensors.

Hereby, the technical advantage is achieved that a precise position determination of the rotor relative to the stator module may be achieved. By selecting the plurality of magnetic field sensors that are considered for determining the magnetic rotor field for determining the position of the rotor relative to the stator module, a more precise determination of the position of the rotor relative to the stator module may be achieved. For example, the magnetic field sensors of the sensor module may exclusively be selected for measuring the magnetic rotor field for determining the position of the rotor relative to the stator module, which are covered by the rotor in the respective position, the measurement of the magnetic rotor field may be made more precise by the magnetic field sensors.

The magnetic field sensors are arranged to carry out a point measurement of the magnetic rotor field. Moreover, the magnetic rotor field of the rotor is embodied to have a primary contribution in the direction perpendicular to the underside of the rotor. Thus, for measuring the magnetic rotor field with the aid of the magnetic field sensors of the sensor module, primarily the magnetic field sensors positioned directly below the rotor are decisive. By selecting only these magnetic field sensors for determining the magnetic rotor field, it may be avoided that the measurements of the magnetic rotor field are falsified by measuring values of magnetic field sensors positioned remotely to the rotor. Particularly in the case of a plurality of rotors, this may improve the precision of the position determination of individual rotors. Moreover, this may accelerate the determination of the respective magnetic rotor field by reducing the number of magnetic field sensors to be taken into account to the relevant magnetic field sensors.

Alternatively, additional magnetic field sensors may be selected which are not covered by the rotor but are located in direct vicinity to the rotor.

Furthermore, it may be achieved that only those magnetic field sensors are selected for position determination which are required for measuring the magnetic rotor field of the respective rotor. The consideration of magnetic field sensors which cannot make a relevant contribution to the determination of the magnetic rotor field due to their distance to the respective position of the rotor may thus be avoided. This may increase the precision of the determination of the magnetic rotor field and thus the precision of the position determination of the rotor.

Moreover, the computing power required to evaluate the measuring values of the magnetic field sensors for determining the position of the rotor may be reduced by only taking into account magnetic field sensors that are located in the direct spatial vicinity of the rotor.

According to an embodiment, the position allocating function is embodied as an artificial neural network, the method further comprising:

training the neural network to the values of the magnetic rotor field for the plurality of magnetic field sensors of the sensor module determined in the sensor value determining step for the plurality of positions of the rotor relative to the stator module in a training step, wherein the neural network is set up by the training to allocate a position of the rotor relative to the stator module on the basis of the values of the magnetic rotor field determined in the sensor value determining step for the plurality of positions of the rotor relative to the stator module to the plurality of measuring values of the magnetic rotor field measured in the magnetic rotor field determining step.

This has the technical advantage of enabling real-time position determination of the rotor relative to the stator module. By configuring the position allocating function as an artificial neural network, the position determination of the rotor based on the plurality of measuring values of the magnetic rotor field of the plurality of magnetic field sensors may be completed within a predetermined time interval. Thus, the position determination may particularly be completed within one control cycle of the planar drive system. This allows for highly efficient control of the planar drive system.

Via the training process, a plurality of allocations between various positions of the rotor relative to the stator module and corresponding measuring values of the magnetic rotor field recorded by magnetic field sensors of the sensor module may be integrated into the neural network so that the neural network may allocate a corresponding position of the rotor relative to the stator module to newly recorded measuring values of the magnetic rotor field based on these acquired allocations.

According to an embodiment, the planar drive system comprises at least a further rotor, wherein the further rotor comprises a further magnetic rotor field, and wherein the method for controlling a planar drive system according to the application further comprises:

generating a further position allocating function in the allocation generating step, wherein the further position allocating function comprises a plurality of further allocations between positions of the further rotor relative to the stator module and measuring values of the further magnetic rotor field from a plurality of magnetic field sensors of the sensor module, and wherein in each further allocation of the further position allocating function for a position of the further rotor relative to the stator module, a value of the further magnetic rotor field is uniquely allocated to each magnetic field sensor of the plurality of magnetic field sensors of the sensor module;

measuring a plurality of measuring values of the further magnetic rotor field by magnetic field sensors of the sensor module for a position of the further rotor relative to the stator module in the magnetic rotor field determining step;

applying the further position allocating function to the plurality of measuring values of the further magnetic rotor field of the magnetic field sensors with the further allocations of the further position allocating function in the measuring value analysis step, wherein in each further allocation of the further position allocating function for a position of the further rotor relative to the stator module, each magnetic field sensor of the plurality of magnetic field sensors of the sensor module is uniquely assigned a value of the further magnetic rotor field; and determining the position of the further rotor relative to the stator module on the basis of the measuring values of the further rotor magnetic field measured by the plurality of magnetic field sensors and based on the further allocations of the further position allocating function in the position determining step.

This has the technical advantage of enabling precise and accurate position determination for a plurality of rotors. By allocating an individual position allocating function to each rotor, a precise position determination and thus a precise and accurate control may be achieved for each rotor. In particular, in the embodiment of the position allocating function as an artificial neural network, each rotor may be allocated an individual artificial neural network that has been trained with the respective measuring values of the three-dimensional measurement of the respective magnetic rotor field and the associated determinations of the expected measuring values of the respective magnetic field sensors selected for position determination. Thus, via each individual artificial neural network, precise position determination may be achieved individually for each rotor of the planar drive system. In particular, the individual three-dimensional measurement of the respective magnetic rotor field and the associated individual embodiment of the respective artificial neural network may take into account production-related deviations of the individual magnetic rotor fields of the different rotors of the planar drive system in the position determination.

By performing an individual three-dimensional measurement of the respective magnetic rotor field for each rotor of the planar drive system, production-related deviations of the magnetic rotor fields of individual rotors may be taken into account when determining the position.

By selecting an individual plurality of magnetic field sensors for measuring the respective magnetic rotor field for each rotor of the planar drive system, a precise determination of the magnetic rotor field and, associated therewith, a precise determination of the position of the respective rotor relative to the stator module may be achieved for each rotor of the planar drive system.

In the magnetic rotor field measuring step, a three-dimensional measurement of the respective magnetic rotor field is performed individually for each rotor of the planar drive system. In the sensor value determining step, a plurality of values of the magnetic rotor field for a plurality of magnetic field sensors of the sensor module are determined individually for each rotor of the planar drive system on the basis of the three-dimensional measurement of the magnetic rotor field. In the allocation-determining step, a plurality of allocations are determined for each rotor of the planar drive system based on the plurality of values of the magnetic rotor field for a plurality of magnetic field sensors and based on the plurality of positions of the rotor. In the magnetic field sensor selecting step, a plurality of magnetic field sensors for determining the magnetic rotor field are selected for each rotor of the planar drive system.

According to an embodiment, the method according to the application further comprises:

creating an allocation data set in an allocation data set creating step, the allocation data set comprising the position allocating function determined in the allocation generating step and/or the corresponding allocations between positions of the rotor relative to the stator module and measuring values of the magnetic rotor field from a plurality of magnetic field sensors of the sensor module.

This achieves the technical advantage that the determined position allocating function and/or the corresponding allocations between positions of the rotor relative to the stator module and measuring values of the magnetic rotor field may be reused for a renewed execution of the method according to the application. Thus, the method may be simplified and accelerated when carried out again. The position allocating function and/or the corresponding allocations may be used accordingly in the position determining step.

The allocation generating step may be performed on site so that a user of the planar drive system may perform the method according to the application and, in particular, the position determining step with the corresponding position allocating function and/or allocations based on the generated allocation data set, which the user may download from a server, for example.

The allocation data set may be stored in the control unit and/or in a processor unit/memory unit located on the rotor and/or in an external processor unit/memory unit of the planar drive system.

According to an embodiment, the method according to the application further comprises:

creating a magnetic rotor field data set in a magnetic rotor field data set creating step, wherein the magnetic rotor field data set comprises the measuring values of the magnetic rotor field recorded in the magnetic rotor field measuring step.

This achieves the technical advantage that the measuring values of the magnetic rotor field recorded in the magnetic rotor field measuring step may be reused for renewed execution of the method according to the application. Thus, the method may be simplified and accelerated when it is carried out again. The measuring values of the magnetic rotor field may be used accordingly in the allocation generating step.

The magnetic rotor field measuring step may thus be performed on site, so that a user of the planar drive system may carry out the method according to the application and in particular the allocation generating step with the corresponding measuring values of the magnetic rotor field on the basis of the created magnetic rotor field data set, which the user may download from a server, for example.

The magnetic rotor field data set may be stored in the control unit and/or in a processor unit/memory unit located on the rotor.

According to an embodiment, the method further comprises:

identifying the rotor based on the individual magnetic rotor field of the rotor in a rotor magnetic identifying step, the rotor identifying step comprising:

comparing the plurality of measuring values of the magnetic rotor field measured in the magnetic rotor field determining step with the plurality of measuring values of the magnetic rotor field recorded in the magnetic rotor field measuring step in a second comparing step.

This has the technical advantage of enabling unique identification of each rotor of the planar drive system.

A planar drive system comprising at least a control unit, a stator module, a rotor and a magnetic field measuring arrangement is provided, wherein the control unit is connected to the stator module via at least a data link, wherein the stator module comprises a plurality of electrically energizable stator conductors for generating magnetic stator fields for electrically controlling the rotor, wherein the rotor comprises a magnet arrangement for generating a magnetic rotor field, wherein a magnetic coupling between the rotor and the stator module may be achieved via the magnetic stator field and the magnetic rotor field, wherein the stator module comprises a sensor module having a plurality of magnetic field sensors for determining a position of the rotor, wherein the magnetic field sensors are arranged in a two-dimensional array at the stator module, wherein each magnetic field sensor is arranged to determine the magnetic rotor field for a spatial area in the two-dimensional array, and wherein the control unit is arranged to perform a method according to the application for controlling a planar drive system.

Thereby, a planar drive system may be provided that has precise and improved control and is embodied to carry out the method of the application with the aforementioned advantages.

BRIEF DESCRIPTION OF THE DRAWINGS

The application is described in more detail with reference to the accompanying figures, in which.

DETAILED DESCRIPTION

Figure 1:
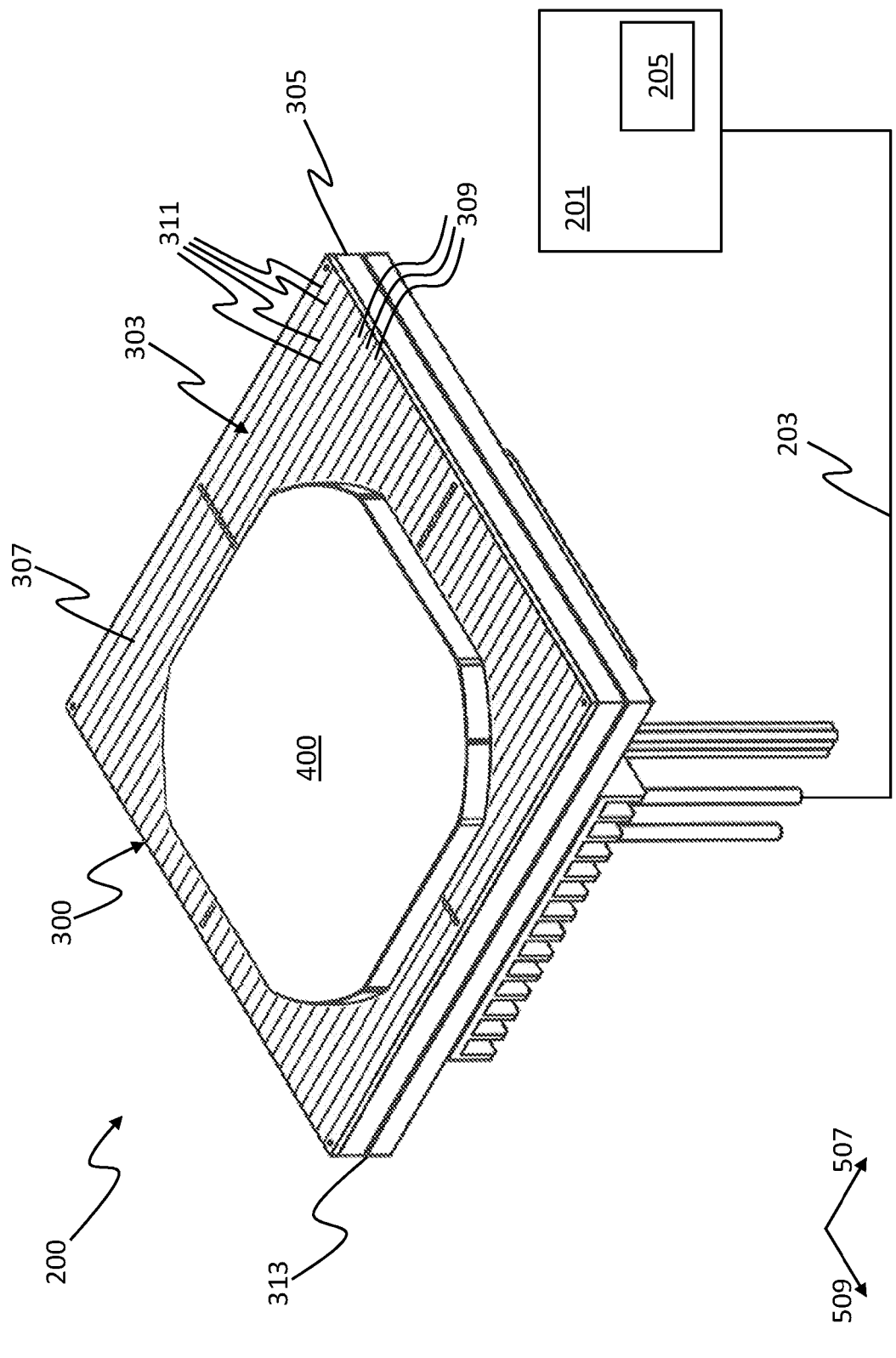
FIG. 1 is a schematic depiction of a planar drive system comprising a stator module and a rotor according to an embodiment.

FIG. 1 shows a schematic view of a planar drive system 200 with a stator module 300 and a rotor 400.

According to the embodiment in FIG. 1, the planar drive system comprises a control unit 201, a stator module 300, and a rotor 400. The control unit 201 is connected to the stator module 300 via a data link 203. The control unit 201 comprises a position allocating function 205 and is arranged to execute a method according to the application for controlling a planar drive system 200.

For a detailed description of the method according to the application for controlling a planar drive system 200 and the operation of the position allocating function 205, reference is made to the description for FIG. 4, FIG. 5, FIG. 7 and FIG. 8.

The stator module 300 has a planar stator surface 303. The planar stator surface 303 is arranged on an upper surface of a stator module housing 305. A rotor 400 is disposed above the stator surface 303. The stator surface 303 is part of a stator unit 307 for an electric drive of the rotor 400. The stator unit 307 with the stator surface 303 may be embodied as a printed circuit board. The stator surface 303 is square in shape.

Above the stator surface 303, the rotor may be driven in at least a first direction 507 and a second direction 509. Moreover, the rotor 400 may also be drivend in a third direction arranged perpendicular to the first direction 507 and the second direction 509. The stator surface 303 comprises a plurality of stator conductors 309, which are embodied as stator conductors 309 in the embodiment shown in FIG. 1, and which are substantially aligned along the first direction 507. The stator conductors 309 are embodied to conduct current and may be energized to drive the rotor 400. A stator conductor gap 311 is provided between the stator conductors 309, through which the stator conductors 309 are electrically isolated from each other. The stator surface 303 is also electrically insulated from the stator conductors 309. A further arrangement of stator conductors may be provided below the stator surface 303, in which the stator conductors are substantially aligned along the second direction 509.

Electronic modules for driving and controlling the rotor 400 are arranged in the stator module housing 305. The electronic modules may e.g. comprise power modules for generating the drive currents and control modules for controlling the power modules and the drive currents. On a bottom side of the stator module housing 305 opposite to the stator surface 303, connections are arranged for connecting the stator module 300 to a plurality of connection lines. For example, the connection lines may comprise a control line for transmitting control signals for the control modules and a power supply line for supplying electrical power to the power and/or control modules. In particular, electrical energy for generating the drive currents may be supplied to the power module via the energy supply line.

The stator module housing 305, the stator unit 307 and the stator surface 303 are rectangular, in particular square, in the top view of the stator surface.

The stator module housing 305 has a sectional plane 313. A sensor module may be arranged inside of the stator module housing 305 at the level of the sectional plane 313.

Figure 2:
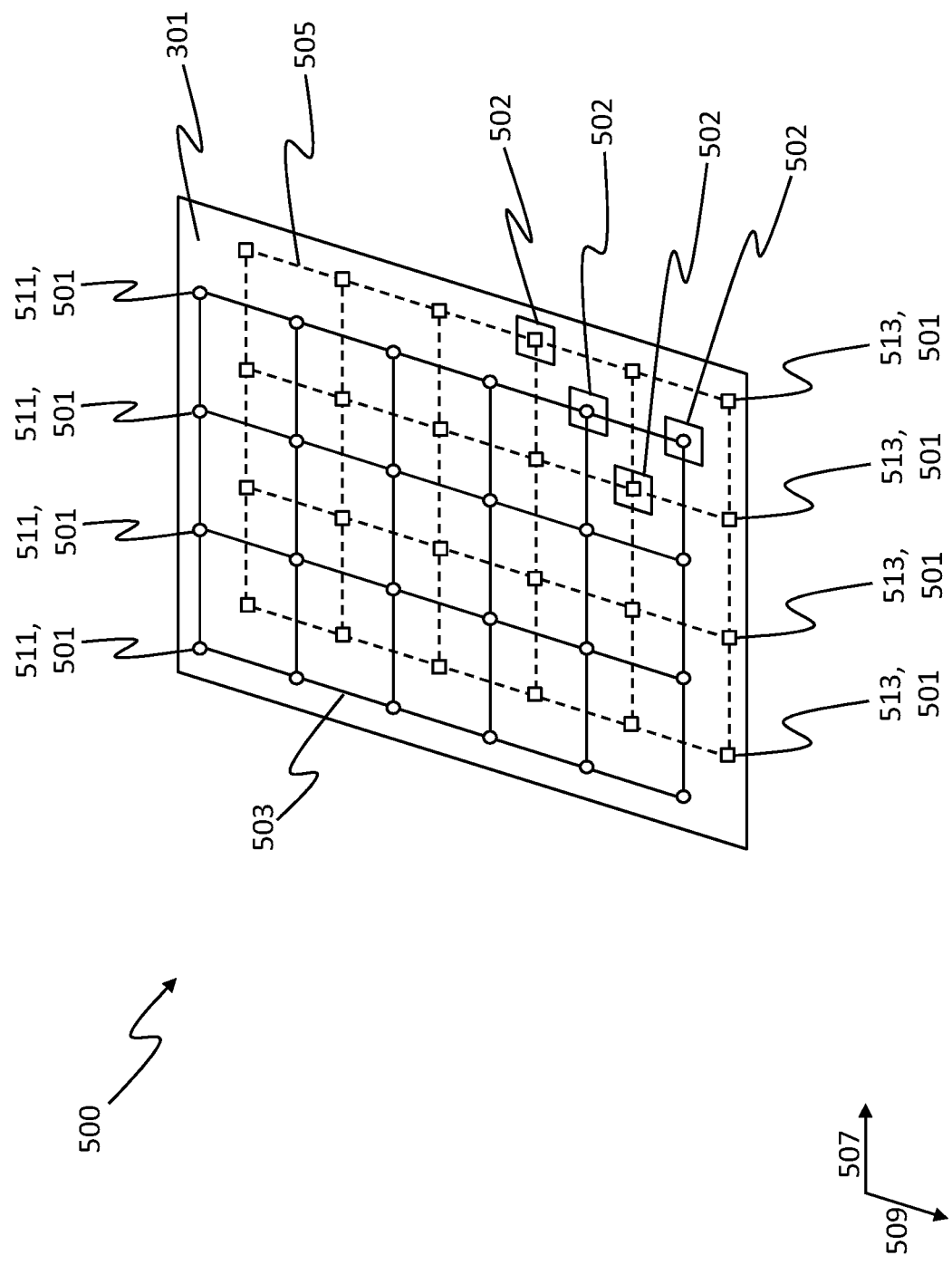
FIG. 2 shows a schematic perspective view of a sensor module of the stator module according to an embodiment.

FIG. 2 shows a perspective view of a sensor module 500 for detecting a position of the rotor 400 in the planar drive system 200. The sensor module 500 is rectangular and has a two-dimensional array of magnetic field sensors 501 on a carrier 301 of the stator module 300. Thus, the magnetic field sensors 501 are arranged on the carrier 301. The two-dimensional array of magnetic field sensors 501 comprises a first periodic grid 503 of magnetic field sensors 501 and a second periodic grid 505 of magnetic field sensors 501. The magnetic field sensors 501 of the first grid 503 are indicated by round symbols, while the magnetic field sensors 501 of the second grid 505 are indicated by square symbols. Alternatively, the sensor module 500 or the arrangement of the magnetic field sensors 501 may be square, parallelogram-shaped or any other advantageous shape.

Where reference is made to magnetic field sensors 501 in general terms for the purposes of the application, reference numeral 501 is used.

The first magnetic field sensors 511 are connected with solid lines to illustrate the grid structure of the first grid 503. The second magnetic field sensors 513 are connected with dashed lines to illustrate the grid structure of the second grid 505. The first magnetic field sensors 511 and the second magnetic field sensors 513 may be identical, and the round and square symbols respectively are only intended to symbolize the positions of the magnetic field sensors 501 associated with the respective sub-arrays.

The first grid 503 and the second grid 505 are identically configured and displaced with respect to each other. As a result, the second magnetic field sensors 513 of the second grid 505 and the first magnetic field sensors 511 of the first grid 503 are each displaced with respect to one another.

The arrangement of magnetic field sensors 501 shown in FIG. 2 is for illustrative purposes only and may differ from the arrangement shown in FIG. 2.

The magnetic field sensors 501 are each set up to determine magnetic fields for a spatial area 502. Measurements of a magnetic field sensor 501 are thus limited to the respective spatial area 502 of the respective magnetic field sensor 501. In the embodiment of FIG. 2, the spatial areas 502 are shown as rectangular or square areas. This is merely due to depictional reasons. The spatial areas 502 of the magnetic field sensors 501 may also have geometrically different spatial extents and may e.g. be circular in shape. In particular, the spatial areas 502 may have a point-shaped embodiment, so that point measurements of the respective magnetic fields may be carried out by the magnetic field sensors 501, in which individual magnetic field sensors 501 exclusively measure field contributions of the respective magnetic fields that are arranged directly at the positions of the respective magnetic field sensors 501.

The carrier 301 is planar, so that the magnetic field sensors 501 are arranged in a plane, i.e. in a two-dimensional array.

The magnetic field sensors 501 may be embodied as Hall sensors. In particular, the magnetic field sensors 501 may be embodied as 2D or 3D Hall sensors, with 3D Hall sensors measuring the magnetic field components in three linearly independent spatial directions. In particular, these spatial directions may comprise the first direction 507 and the second direction 509 as well as a third direction perpendicular to the first direction 507 and the second direction 509.

The carrier 301 may be embodied as a printed circuit board and/or as a circuit board. This allows for the carrier 301 to be provided in a simple way.

The arrangement of magnetic field sensors 501 may comprise exactly two partial arrangements of the two grids 503, 505.

Figure 3:
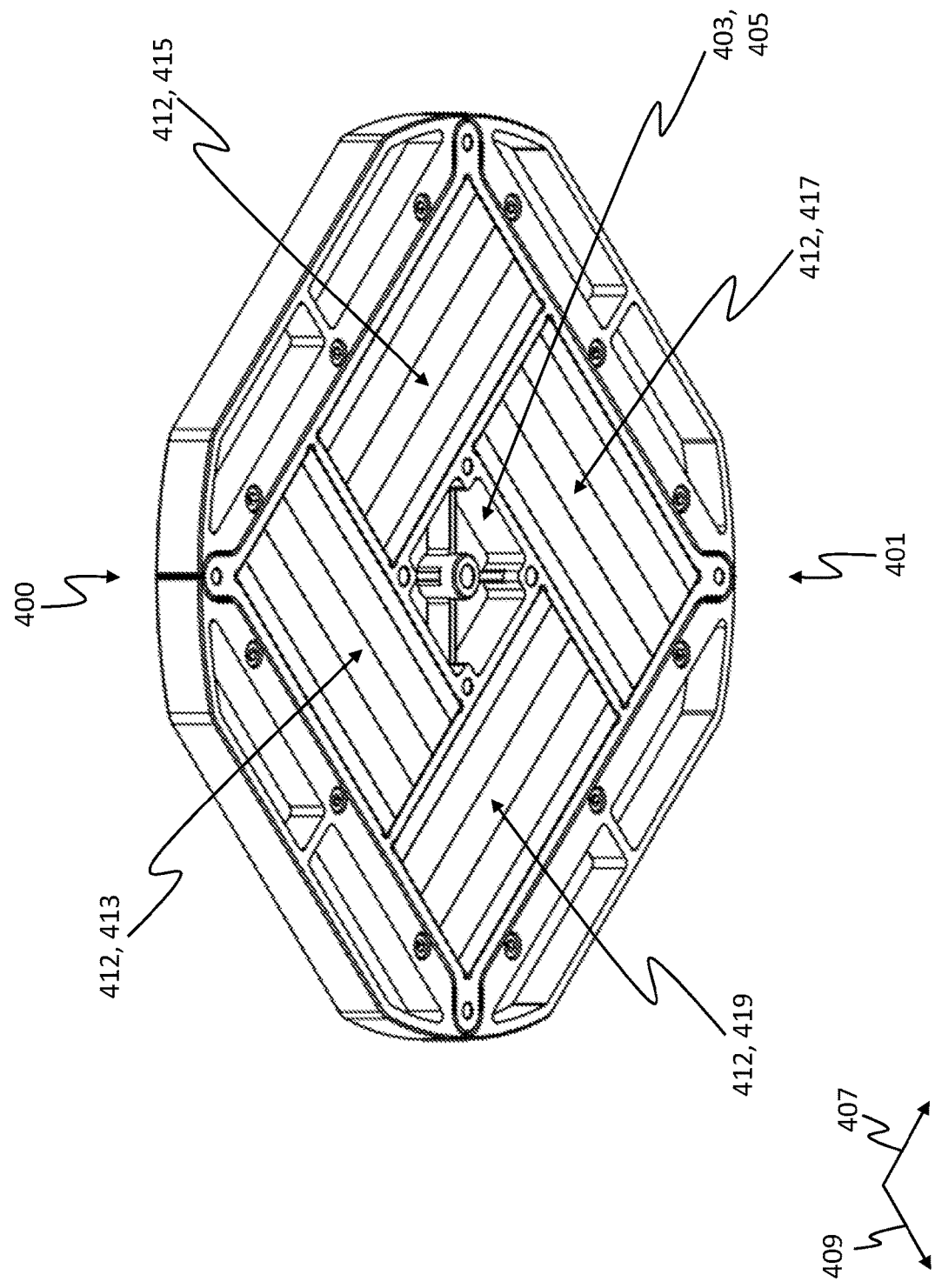
FIG. 3 shows a schematic depiction of an underside of a rotor according to a further embodiment.

FIG. 3 shows the rotor 400 of the planar drive system 200 in a bottom view of an underside of the rotor 400. During operation of the planar drive system 200, the underside of the rotor 400 is arranged facing the stator surface 303 of the stator module 300. The rotor has a magnet arrangement 401 400 on the underside. The magnet arrangement 401 is rectangular, in particular square, in shape and comprises a plurality of magnets. The underside of the rotor 400 is flat or planar, in particular in the area of the magnets of the magnet arrangement 401. During operation, the underside of the rotor 400 with the magnet arrangement 401 is essentially oriented in parallel to the stator surface 303 and is arranged facing the stator surface 303.

The magnet arrangement 401 comprises a first magnet unit 413, a second magnet unit 415, a third magnet unit 417, and a fourth magnet unit 419, generally referred to as the magnet unit 412. The first magnet unit 413 and the third magnet unit 417 each comprise elongated drive magnets arranged side by side in a first rotor direction 407 and extending in a second rotor direction 409 oriented perpendicularly to the first rotor direction 407. The second magnet unit 415 and the fourth magnet unit 419 each comprise elongated drive magnets arranged side by side in the second rotor direction 409 and extending along the first rotor direction 407. In operation, the first and third magnet units 413, 417 serve to drive the rotor 400 in a first rotor direction 407, and the second and fourth magnet unit 415, 419 serve to drive the rotor 400 in the second rotor direction 409. Moreover, the first magnet unit 413, the second magnet unit 415, the third magnet unit 417 and the fourth magnet unit 419 serve to drive the rotor 400 in a third rotor direction arranged perpendicularly to the first rotor direction 407 and to the second rotor direction 409.

In the center of the magnet arrangement 401, the rotor 400 has a free area 403 that is not covered by magnets of the magnet arrangement 401. In the area of the free area 403, the rotor 400 has a fastening structure 405. Other components, such as a circuit board, may also be arranged in the free area 403.

Figure 4:
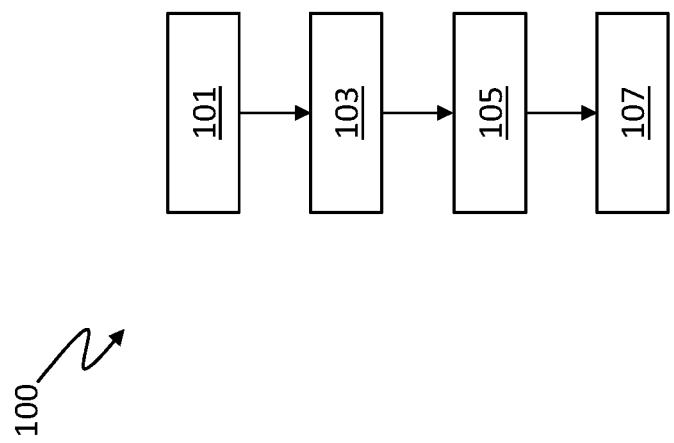
FIG. 4 is a flowchart of a method for controlling a planar drive system according to an embodiment.

FIG. 4 shows a flowchart of a method 100 for controlling a planar drive system 200 according to an embodiment.

The method 100 for controlling a planar drive system 200 is applicable to a planar drive system 200 according to the embodiments in FIG. 1 to FIG. 3. The method 100 in FIG. 4 is described with reference to FIG. 6.

According to the embodiment of FIG. 4, a planar drive system 200 comprises at least a control unit 201, a stator module 300, and a rotor 400, wherein the stator module 300 is configured to generate magnetic stator fields for electrically controlling the rotor 400, wherein the rotor 400 comprises a magnet arrangement 401 for generating a magnetic rotor field 402, wherein a magnetic coupling between the rotor 400 and the stator module 300 may be achieved via the magnetic stator fields and the magnetic rotor field 402, wherein the stator module 300 comprises a sensor module 500 with a plurality of magnetic field sensors 501 for determining a position of the rotor 400, wherein the magnetic field sensors 501 are arranged in a two-dimensional array on or in the stator module 300, and wherein each magnetic field sensor 501 is configured to determine the magnetic rotor field 402 for a spatial area in the two-dimensional array.

According to the embodiment shown in FIG. 4, the method 100 comprises the method steps:

generating a position allocating function 205 in an allocation generating step 101, wherein the position allocating function 205 is configured to assign a position of the rotor 400 relative to the stator module 300 to a plurality of measuring values of the magnetic rotor field 402 of a plurality of magnetic field sensors 501 of the sensor module 500;

measuring a plurality of measuring values of the magnetic rotor field 402 via magnetic field sensors 501 of the sensor module 500 for a position of the rotor 400 relative to the stator module 300 to be determined in a magnetic rotor field determining step 103;

applying the position allocating function 205 to the plurality of measuring values of the magnetic rotor field 402 of the plurality of magnetic field sensors 501 determined in the magnetic rotor field determining step 103 in a measuring value analysis step 105; and determining the position of the rotor 400 relative to the stator module 300 via the position allocating function 205 in a position determining step 107.

In an allocation generating step 101, a position allocating function 205 is generated. The position allocating function 205 is arranged to allocate a position of the corresponding rotor 400 relative to the stator module 300 to a plurality of measuring values of the magnetic rotor field 402 recorded by a plurality of magnetic field sensors 501 of the sensor module 500, based on the arrangement of the magnetic field sensors 501 within the sensor module 500 and thus within the stator module 300.

For this purpose, the position allocating function 205 may comprise a plurality of allocations between positions of the rotor 400 relative to the stator module 300 and measuring values of the magnetic rotor field 402 from a plurality of magnetic field sensors 501 of the sensor module 500. The allocations of the position allocating function 205 are each configured as a unique relation between positions of the rotor 400 and measuring values of the magnetic rotor field 402 from a selected plurality of magnetic field sensors 501.

In particular, generating the position allocating function 205 may be carried out prior to operating the planar drive system 200. For example, it may be performed in an initialization process of the planar drive system 200. Alternatively, generating the position allocating function 205 may be performed on site.

After generating the position allocating function 205, to determine a position of the rotor 400 relative to the stator module 300, a plurality of measuring values of the magnetic rotor field 402 is determined by a plurality of magnetic field sensors 501 in a magnetic rotor field determining step 103. For each position determination of the rotor 400, measurements of the magnetic rotor field 402 are made by appropriate magnetic field sensors 501 of the sensor module 500, and thus a plurality of measuring values of the magnetic rotor field 402 is determined for a plurality of different spatial areas 502.

Subsequently, the position allocating function 205 is applied to the plurality of measuring values of the magnetic rotor field 402 measured in the magnetic rotor field determining step 103 by the plurality of magnetic field sensors 501 for the plurality of spatial areas 502 in a measuring value analysis step 105.

A sensor image of the magnetic rotor field 402 is acquired by the plurality of magnetic field sensors 501 in the magnetic rotor field determining step 103, the sensor image consisting of the plurality of measuring values of the magnetic rotor field 402 for the respective spatial areas 502 of the individual magnetic field sensors 501. Each allocation of the position allocating function 205 corresponds to a respective sensor image that also comprises a plurality of values of the magnetic rotor field 402 for a plurality of spatial areas 502 of a plurality of magnetic field sensors 501, wherein the sensor image of the allocation is associated with a uniquely determined position of the rotor 400 relative to the stator module 300. In this regard, the associated position is contributed to by the respective magnetic field sensors 501 through which the respective sensor image is given. By applying the position allocating function 205, in which the allocations between positions of the rotor 400 relative to the stator module 300 and measuring values of the magnetic rotor field 402 are integrated, to the plurality of measuring values of the magnetic rotor field 402 taken in the magnetic rotor field determining step 103, the sensor image determined in the magnetic rotor field determining step 103 by the plurality of measuring values of the plurality of magnetic field sensors 501 is analyzed in the measuring value analysis step 105 with reference to the sensor images of the allocations integrated in the position allocating function.

Here, a position of the rotor 400 relative to the stator module 300 is allocated to the measured sensor image by the position allocating function 205 in the position determining step 107 based on the allocations of the position allocating function 205 for the sensor image, thereby determining a real position of the rotor 400.

Figure 5:
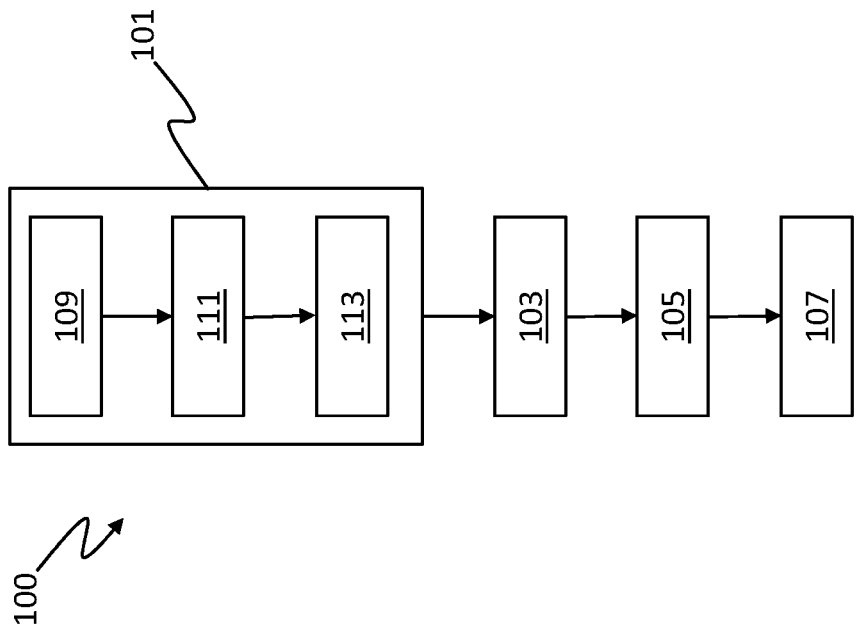
FIG. 5 shows a further flowchart of a method for controlling a planar drive system according to an embodiment.

FIG. 5 shows a further flowchart of the method 100 for controlling a planar drive system 200 according to one embodiment.

FIG. 5 is described with reference to FIG. 6.

The embodiment in FIG. 5 is based on the embodiment in FIG. 4 and comprises all the method steps of the embodiment in FIG. 4. To avoid unnecessary repetition, the method steps of the embodiment in FIG. 4 are not described in detail again below.

Deviating from the embodiment in FIG. 4, in the embodiment in FIG. 5 the allocation generating step 101 comprises a magnetic rotor field measuring step 109. In the magnetic rotor field measuring step 109, a three-dimensional measurement of the magnetic rotor field 402 of the respective rotor 400 is determined. A three-dimensional array of discrete measurement points of the magnetic rotor field 402 may be used to determine the three-dimensional measurement of the magnetic rotor field 402. For this purpose, a magnetic field measuring arrangement 600, which may be moved in three spatial dimensions relative to the rotor 400 and comprises magnetic field sensor units 601, may be used to record a plurality of measuring values for the magnetic rotor field 402 to be determined in all three spatial directions. For this purpose, the magnetic field measuring arrangement 600 may be moved relative to the rotor 400 in all three spatial directions. Alternatively, the rotor 400 may be moved relative to the magnetic field measurement arrangement 600 in all three spatial directions.

The plurality of measuring values of the magnetic rotor field 402 by the plurality of magnetic field sensor units 601 allows the magnetic rotor field 402 to be scanned in all three spatial dimensions, thus achieving a three-dimensional measurement of the magnetic rotor field 402.

The magnetic field sensor units 601 may be Hall sensors, in particular two-dimensional or three-dimensional Hall sensors.

The magnetic field measurement arrangement 600 may comprise a magnetic field sensor unit 601. To create a three-dimensional array of discrete measurement points, this one magnetic field sensor unit 601 may be moved relative to the rotor 400 in all three spatial directions, and measurements of the magnetic rotor field 402 may be taken at different spatial points. Alternatively, the magnetic field measurement arrangement 600 may comprise a one-dimensional array of at least two magnetic field sensor units 601. Alternatively, the magnetic field measurement arrangement 600 may comprise a two-dimensional array of magnetic field sensor units 601. These may be moved in all three spatial directions or, for example, only in two spatial directions or only in one spatial direction relative to the rotor 400 to achieve the desired three-dimensional array of discrete measurement points and thus three-dimensional measurement of the magnetic rotor field 402. Alternatively, the magnetic field measurement arrangement 600 may comprise a three-dimensional array of magnetic field sensor units 601, which in turn may be moved in all three spatial directions relative to the rotor 400. Thus, any three-dimensional array of discrete measurement points of the magnetic rotor field 402 may be achieved, in which measurements of the magnetic rotor field 402 are taken at any spatial points.

Furthermore, the three-dimensional measurement of the magnetic rotor field 402 may be represented by a model description of the three-dimensional array of discrete measurement points. The model description may comprise interpolations of the three-dimensional array of discrete measuring points. Through this, values of the magnetic rotor field 402 may be generated on the basis of the interpolation for spatial points for which no measuring values of the magnetic rotor field 402 were recorded in the magnetic rotor field measuring step 109. In this way, a complete three-dimensional measurement of the magnetic rotor field 402 may be achieved, in which values of the magnetic rotor field 402 are provided for any spatial points.

Subsequently, based on the three-dimensional measurement of the magnetic rotor field 402, a sensor value determining step 111 determines a plurality of values of the magnetic rotor field 402 for a plurality of magnetic field sensors 501 of the sensor module 500 of the stator module 300 for a plurality of positions of the rotor 400 relative to the stator module 300. Due to comprehensive knowledge of the three-dimensional configuration of the magnetic rotor field 402 and based on knowledge of the positioning of the individual magnetic field sensors 501 in the stator module 300, values of the magnetic rotor field 402 may be determined for the spatial areas 502 of the individual magnetic field sensors 501 for any position of the rotor 400 relative to the stator module 300. Thus, by knowing the three-dimensional embodiment of the magnetic rotor field 402, a measuring value of the magnetic rotor field 402 may be predicted for any position of the rotor 400 relative to the stator module 300 for the magnetic field sensors 501.

In the embodiment shown in FIG. 5, the position allocating function 205 is embodied as a neural network. In a training step 113, the neural network is trained on the values of the magnetic rotor field 402 for the plurality of magnetic field sensors 501 of the sensor module determined in the sensor value determining step 111 for the plurality of positions of the rotor 400 relative to the stator module 300.

For this purpose, the measuring values of the magnetic rotor field 402 determined in the sensor value determining step 111 are input as training data into the neural network and the latter is trained to the corresponding positions of the rotor 400 relative to the stator module 300 until the neural network is set up to allocate a corresponding position of the rotor 400 to new measuring values of the magnetic rotor field 402 which were not recorded for training the neural network but for determining the position of the rotor 400. Through the training process in training step 113, the neural network thus learns a plurality of allocations between measuring values of the magnetic rotor field 402 and associated positions of the rotor 400 relative to the stator module 300, so that the neural network may determine corresponding positions of the rotor 400 relative to the stator module 300 based on these learned allocations for new measuring values of the magnetic rotor field 402.

The measuring values of the magnetic rotor field 402 determined in the sensor value determining step 111 in this case comprise measuring values of a plurality of magnetic field sensors 501 which cover a contiguous area of the stator module 300 and are thus suitable for creating an area-based image of the magnetic rotor field 402. Taking into account the magnetic field sensors 501 involved in the measurement of the measuring values of the magnetic rotor field 402 and their positioning on the stator module 300, an allocation of a corresponding position of the rotor 400 relative to the stator module 300 is allowed for by determining a position of the rotor 400 by the positioning of the magnetic field sensors 501 measuring the magnetic rotor field 401.

By measuring the magnetic rotor field 402 in three dimensions, comprehensive knowledge of the three-dimensional configuration of the magnetic rotor field 402 is achieved. Through the comprehensive knowledge of the three-dimensional configuration of the magnetic rotor field 402, a uniquely determined value of the magnetic rotor field 402 may be allocated to each magnetic field sensor 501 of a plurality of magnetic field sensors 501 of the sensor module 500 for any position of the rotor 400 relative to the stator module 300. Through this, the comprehensive knowledge of the magnetic rotor field 401 may be used to determine exactly which of the magnetic field sensors 501 measure which portion of the magnetic rotor field 401. Thus, the neural network may be used to accurately determine the position of the rotor 400 relative to the stator module 300.

By accurately measuring the magnetic rotor field 402, an orientation of the rotor 400 relative to the stator module 300 may be determined in addition to a position of the rotor 400 relative to the stator module 300, which primarily comprises a translational positioning of the rotor 400 relative to the stator module 300, by the plurality of different magnetic field sensors 501. In this regard, an orientation of the rotor 400 comprises a rotation of the rotor 400 about an axis of rotation oriented perpendicularly to the stator surface 303. The determination of the position of the rotor 400 relative to the stator module 300 may thus be used to determine a translational positioning and a rotational orientation of the rotor 400 relative to the stator module 300.

By performing a three-dimensional measurement of the magnetic rotor field 401 in the magnetic rotor field measuring step 109, which results in a three-dimensional grid of the magnetic rotor field 401 in which, according to the grid density, an individual value of the magnetic rotor field 401 is assigned to any spatial point, by measuring value of the magnetic rotor field 402 recorded by a magnetic field sensor 501 of the sensor module 500, this measuring value of the magnetic rotor field 402 may be located in the three-dimensional measurement of the magnetic rotor field 402 and thus this magnetic field sensor 501 may be positioned relative to the rotor 400. By following a corresponding procedure for a plurality of measuring values of the magnetic rotor field 402 of a plurality of different magnetic field sensors 501, a relative positioning of the respective magnetic field sensors 501 to the rotor 400 and thus, taking into account the positioning of the individual magnetic field sensors 501 on the stator module 300, a position of the rotor 400 relative to the stator module 300 may be determined.

Via the training process in training step 113, the neural network is able to perform these relative positionings of the individual magnetic field sensors 501 relative to the rotor 400 and, in conjunction therewith, determine a position of the rotor 400 relative to the stator module 300.

Figure 6:
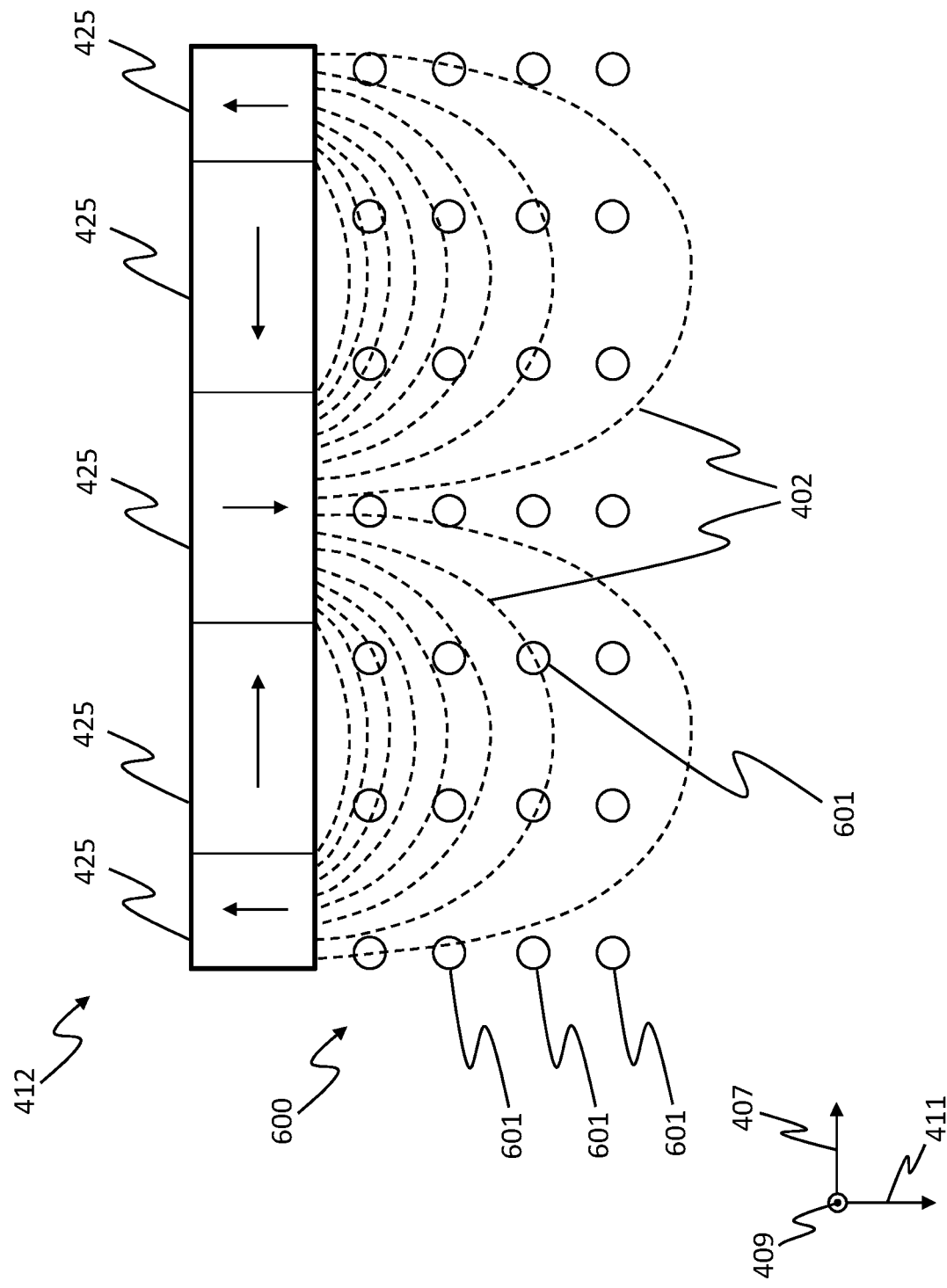
FIG. 6 is a schematic depiction of a rotor and a magnetic field measuring arrangement according to an embodiment.

FIG. 6 shows a schematic diagram of a rotor 400 and a magnetic field sensing arrangement 600 according to one embodiment.

FIG. 6 shows a rotor 400, in particular a magnet unit 412 of the magnet arrangement 401 of the rotor 400, and a magnetic field measuring arrangement 600. The magnet unit 412 of the rotor 400 comprises a plurality of magnets 425. The individual magnets 425 have individual magnetization, the magnetization directions of which are shown by the differently oriented arrows. The individual magnets 425 of the magnet unit 412 are arranged in a Halbach arrangement.

Further, a magnetic rotor field 402 of the illustrated rotor 400 is shown in part. In FIG. 6, only the portion of the magnetic rotor field 402 extending from the underside of the rotor 400 is shown.

The magnetic field measuring arrangement 600 is embodied as a three-dimensional array of magnetic field sensor units 601. For illustrative reasons, only a two-dimensional depiction is shown in FIG. 6. The magnetic field sensing arrangement 600 may be moved relative to the rotor 400 along the first rotor direction 407, the second rotor direction 409, and the third rotor direction 411. Alternatively, the rotor 400 is movable relative to the magnetic field sensing arrangement 600.

A three-dimensional array of discrete measurement points of the magnetic field 402 may be recorded by the plurality of magnetic field sensor units 601.

The depiction of the rotor 400, in particular of the magnet unit 412, and the magnetic field measuring arrangement 600 is exclusively exemplary. In particular, the dimensions are not correctly reproduced. Deviating from the embodiment of the rotor 400, the magnet unit 412 and the magnetic field measuring arrangement 600 as shown in FIG. 6, both the rotor 400, the magnet unit 412 and the magnetic field measuring arrangement 600 may be embodied differently.

Figure 7:
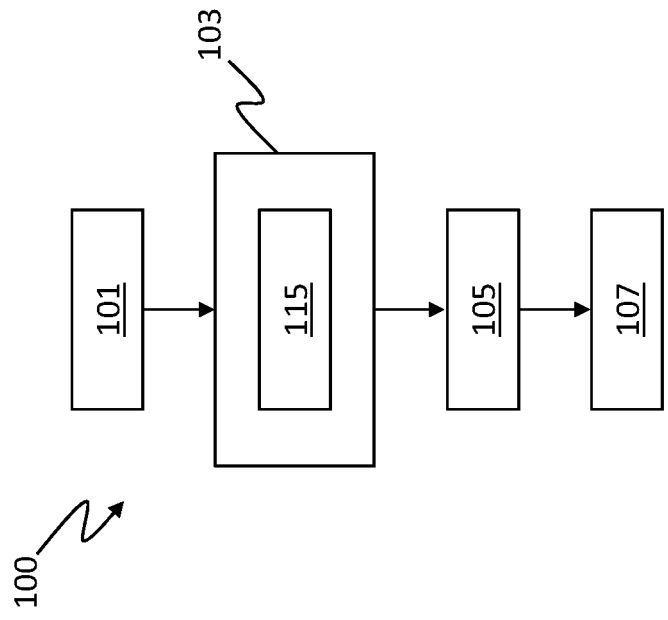
FIG. 7 shows a further flowchart of a method for controlling a planar drive system according to an embodiment.

FIG. 7 shows another flowchart of the method 100 for controlling a planar drive system 200 according to a further embodiment.

The embodiment in FIG. 7 is based on the embodiment in FIG. 4 and comprises all the method steps of the embodiment in FIG. 4. To avoid unnecessary repetition, the method steps of the embodiment in FIG. 4 are not described in detail for the purposes of the application.

Deviating from the embodiment in FIG. 4, in the embodiment in FIG. 7 the magnetic rotor field determining step 103 comprises a magnetic field sensor selecting step 115. In the magnetic field sensor selecting step 115, a plurality of magnetic field sensors 501 of the sensor module 500 are selected for a position determination of the rotor 400 relative to the stator module 300. Preferably, the selection is hereby limited to the magnetic field sensors 501 that may make a relevant contribution to determining the magnetic rotor field 402 of the rotor 400 in the respective position relative to the stator module 300. Preferably, the magnetic field sensors 501 of the sensor module 500 are selected to be located immediately below the rotor 400. Due to the configuration of the magnetic rotor field 402 having a primary component perpendicular to the underside of the rotor 400, magnetic field sensors 501 that are not located immediately below the positioned rotor 400 do not make a relevant contribution to the determination of the magnetic rotor field 402.

Figure 8:
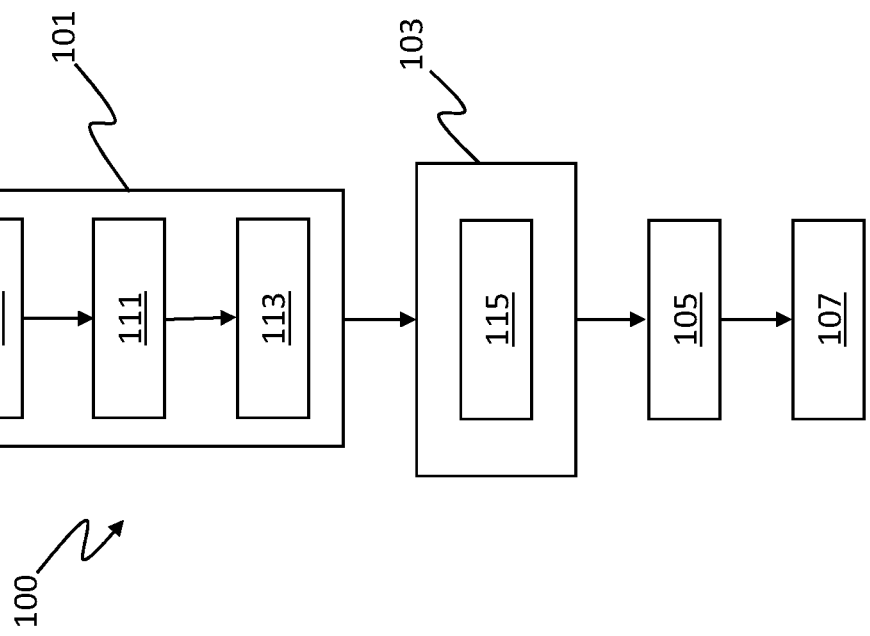
FIG. 8 is a further flowchart of a method for controlling a planar drive system according to an embodiment.

FIG. 8 shows another flowchart of the method 100 for controlling a planar drive system 200 according to a further embodiment.

The embodiment of FIG. 8 corresponds to a combination of the embodiments of FIG. 5 and FIG. 7.

The method 100 according to the application may be applied to a plurality of rotors 400. In particular, an individual position allocating function 205 may be generated for each rotor 400 of the plurality of rotors 400. In particular, for the embodiment of the position allocating function 205 as a neural network, an individual neural network may be generated for each rotor 400. Alternatively, a common position allocating function 205 may be used for each rotor 400 of the plurality of rotors 400.

Figure 9:
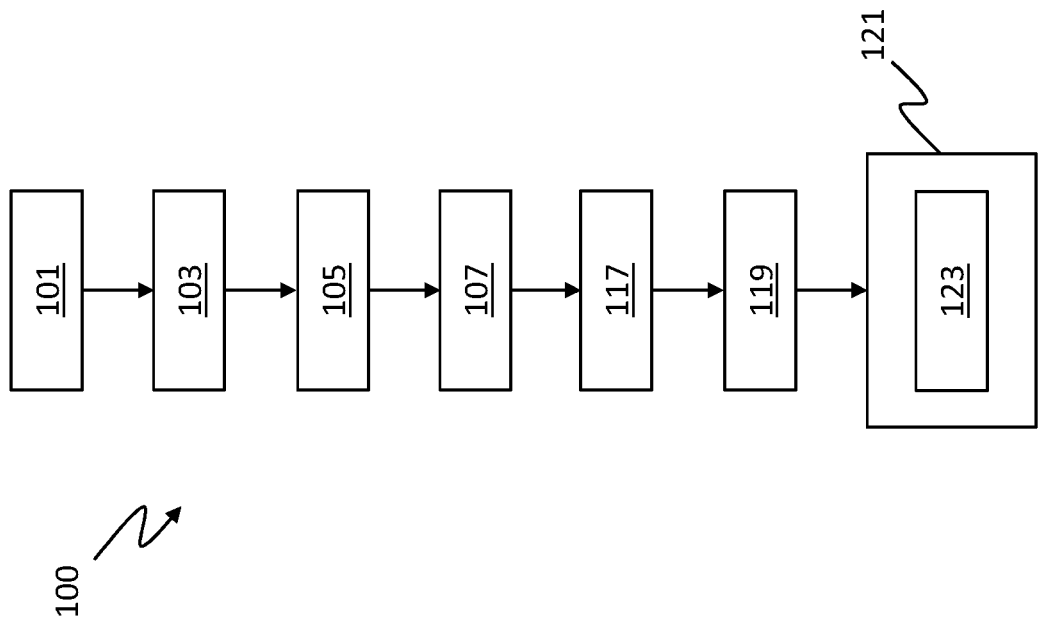
FIG. 9 shows a further flowchart of a method for controlling a planar drive system according to an embodiment.

FIG. 9 shows a further flowchart of the method 100 for controlling a planar drive system 200 according to another embodiment.

The embodiment shown in FIG. 9 is based on the embodiment in FIG. 4 and comprises all the method steps shown there. These are not described again in detail below.

In the embodiment shown in FIG. 9, the method 100 further comprises an allocation data set creating step 117 for creating a data set storing the position allocating function 205 and/or allocations between values of the rotor magnetic rock 402 for different magnetic field sensors 501 of the sensor module 400. The allocation data set may be stored in the control unit 201 of the planar drive system 200. Alternatively, the allocation data set may be stored in a corresponding memory unit and/or processor unit of the rotor 400. Alternatively, the allocation data set may be stored in an external memory unit and/or processor unit, such as an external server.

Furthermore, the method comprises a magnetic rotor field data set creating step 119 for creating a magnetic rotor field data set in which the measuring values of the three-dimensional measurement of the magnetic rotor field 402 recorded in the magnetic rotor field measuring step 109 are stored. The magnetic rotor field data set may be stored in the control unit 201 of the planar drive system 200. Alternatively, the magnetic rotor field data set may be stored in a corresponding memory unit and/or processor unit of the rotor 400. Alternatively, the magnetic rotor field data set may be stored in an external memory unit and/or processor unit, such as an external server.

The present method 100 may be applied to a planar drive system 200 having a plurality of rotors 400 and a plurality of stator modules 300. For a plurality of rotors 400, a measurement of the magnetic rotor field 402 may be performed in the magnetic rotor field measuring step 109 for each rotor 400, and a magnetic rotor field data set may be created accordingly. Further, for each rotor 400, a position allocating function, in particular an individually trained neural network, may be generated and an allocation data set may be created accordingly. Alternatively, a common neural network trained for the multiple rotors 400 may be used.

Furthermore, the method 100 comprises a rotor identifying step 121 in which, based on the magnetic rotor field 402, the respective rotor 400 is uniquely identified by corresponding measurements by the magnetic field sensors 501 of the sensor module 500. Due to the individual measurement of the magnetic rotor field 402 for each rotor 400 of the planar drive system 200, each rotor 400 of the planar drive system 200 may be uniquely identified by measuring the magnetic rotor field 402 by magnetic field sensors 501 of the sensor module 400

For this purpose, the rotor identifying step 121 comprises a comparing step 123 in which the measuring values of the magnetic rotor field 401 measured in the magnetic rotor field determining step 103 are compared with the plurality of measuring values of the magnetic rotor field 401 recorded in the magnetic rotor field measuring step 109. Individual magnetic rotor field data sets of the individual rotors 400 may be used for this purpose.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of reference numerals

100 Method of controlling a planar drive system
101 Allocation generating step
103 Magnetic rotor field determining step
105 Measuring value analysis step
107 Position determining step
109 Magnetic rotor field measuring step
111 Sensor value determining step
113 Training step
115 Magnetic field sensor selecting step
117 Allocation data set creating step
119 Magnetic rotor field data set creating step
121 Rotor identifying step
123 Comparing step
200 Planar drive system
201 Control unit
203 Data link
205 Position allocating function
300 Stator module
301 Carrier
303 Stator surface
305 Stator module housing
307 Stator unit
309 Stator conductor
311 Stator conductor gap
400 Rotor
401 Magnet arrangement
402 Magnetic rotor field
403 Open space
405 Fastening structure
407 First rotor direction
409 Second rotor direction
411 Third rotor direction
412 Magnet unit
413 First magnet unit
415 Second magnet unit
417 Third magnet unit
419 Fourth magnet unit
420 Position range
421 First position range
422 Second position range
423 Movement path
425 Magnet TABLE 1-continued List of reference numerals P1 First position
P2 Second position
500 Sensor module
501 Magnetic field sensor
502 Spatial area
503 First periodic grid
505 Second periodic grid
507 First direction
509 Second direction
511 First magnetic field sensor
513 Second magnetic field sensor
600 Magnetic field measuring arrangement
601 Magnetic field sensor unit

The invention claimed is:

1. A method for controlling a planar drive system,
wherein the planar drive system comprises at least a control unit, a stator module and a rotor,
wherein the stator module is configured to generate magnetic stator fields for electrically controlling the rotor,
wherein the rotor comprises a magnet arrangement for generating a magnetic rotor field,
wherein a magnetic coupling between the rotor and the stator module is achievable via the magnetic stator fields and the magnetic rotor field,
wherein the stator module comprises a sensor module with a plurality of magnetic field sensors for determining a position of the rotor,
wherein the magnetic field sensors are arranged in a two-dimensional array at the stator module, and
wherein each magnetic field sensor is set up to determine the magnetic rotor field for a spatial area in the two-dimensional array;
the method comprising:
generating a position allocating function in an allocation generating step, wherein the position allocating function is configured to allocate a position of the rotor relative to the stator module to a plurality of measuring values of the magnetic rotor field of a plurality of magnetic field sensors of the sensor module;
measuring a plurality of measuring values of the magnetic rotor field by magnetic field sensors of the sensor module for a position of the rotor relative to the stator module, in a magnetic rotor field determining step;
applying the position allocating function to the plurality of measuring values of the magnetic rotor field of the magnetic field sensors of the sensor module, in a measuring value analysis step; and
determining the position of the rotor relative to the stator module by the position allocating function, in a position determining step.

2. The method according to claim 1, wherein the allocation generating step comprises:
measuring a plurality of measuring values of the magnetic rotor field by a magnetic field measuring device in a magnetic rotor field measuring step, wherein a three-dimensional measurement of the magnetic rotor field is determined by the plurality of measuring values of the magnetic rotor field; and
determining, on the basis of the three-dimensional measurement of the magnetic rotor field, a plurality of values of the magnetic rotor field for a plurality of magnetic field sensors of the sensor module for a plurality of positions of the rotor relative to the stator module in a sensor value determining step, wherein for each of the plurality of positions of the rotor relative to the stator module, a value of the magnetic rotor field is assigned to each magnetic field sensor of the plurality of magnetic field sensors of the sensor module according to the three-dimensional measurement of the magnetic rotor field.

3. The method according to claim 2, wherein in the magnetic rotor field measuring step the three-dimensional measurement of the magnetic rotor field is realized by a three-dimensional array of discrete measurement points of the magnetic rotor field.

4. The method according to claim 2, wherein the magnetic field measuring arrangement is moveable in three spatial dimensions and comprises a single magnetic field sensor unit and/or a one-dimensional array of magnetic field sensor units and/or a two-dimensional array of magnetic field sensor units and/or a three-dimensional array of magnetic field sensor units, and wherein the three-dimensional array of discrete measuring points is implemented by measurements of the magnetic field sensor units of the magnetic field sensor arrangement movable in three spatial dimensions.

5. The method according to claim 2, wherein the three-dimensional measurement of the magnetic rotor field comprises a model description of the three-dimensional array of discrete measurement points, and wherein the model description comprises an interpolation of the three-dimensional array of discrete measurement points.

6. The method according to claim 1, wherein the magnetic rotor field determining step comprises:
selecting magnetic field sensors from the magnetic field sensors of the sensor module to determine the magnetic rotor field in a magnetic field sensor selecting step, wherein a determination of the sensor magnetic field is limited to the selected magnetic field sensors.

7. The method according to claim 1, wherein the position allocating function is configured as an artificial neural network, further comprising:
training the neural network on the values of the magnetic rotor field for the plurality of magnetic field sensors of the sensor module determined in the sensor value determining step for the plurality of positions of the rotor relative to the stator module in a training step,
wherein the neural network is configured by the training to allocate a position of the rotor relative to the stator module to the plurality of measuring values of the magnetic rotor field measured in the magnetic rotor field determining step based on the values of the magnetic rotor field determined in the sensor value determining step for the plurality of positions of the rotor relative to the stator module.

8. The method according to claim 1, wherein the planar drive system comprises at least a further rotor, the further rotor having a further magnetic rotor field, further comprising:
generating a further position allocating function in the allocation generating step, wherein the further position allocating function comprises a plurality of further allocations between positions of the further rotor relative to the stator module and measuring values of the further magnetic rotor field from a plurality of magnetic field sensors of the sensor module, and wherein in each further allocation of the further position allocating function for a position of the further rotor relative to the stator module, a value of the further magnetic rotor field is uniquely allocated to each magnetic field sensor of the plurality of magnetic field sensors of the sensor module;

measuring a plurality of readings of the further magnetic rotor field by magnetic field sensors of the sensor module for a position of the further rotor relative to the stator module in the magnetic rotor field determining step;

applying the further position allocating function to the plurality of measuring values of the further magnetic rotor field of the magnetic field sensors in the measuring value analysis step, wherein in each further allocation of the further position allocating function for a position of the further rotor relative to the stator module, a value of the further magnetic rotor field is uniquely allocated to each magnetic field sensor of the plurality of magnetic field sensors of the sensor module; and determining the position of the further rotor relative to the stator module on the basis of the measuring values of the further magnetic rotor field measured by the magnetic field sensors and on the basis of the further allocations of the further position allocating function in the position determining step.

9. The method according to claim 1, further comprising:
creating an allocation data set in an allocation data set creating step, the allocation data set comprising the position allocating function determined in the allocation generating step and/or corresponding allocations between positions of the rotor relative to the stator module and measuring values of the magnetic rotor field from a plurality of magnetic field sensors of the sensor module.

10. The method according to claim 1, further comprising:
creating a magnetic rotor field data set in a magnetic rotor field data set creating step, wherein the magnetic rotor field data set comprises the measuring values of the magnetic rotor field recorded in the magnetic rotor field measuring step.

11. The method according to claim 1, further comprising:
identifying the rotor on the basis of the individual magnetic rotor field of the rotor in a rotor identifying step, wherein the rotor identifying step comprises:
comparing the plurality of measuring values of the magnetic rotor field measured in the magnetic rotor field determining step with the plurality of measuring values of the magnetic rotor field taken in the magnetic rotor field measuring step in a comparing step.

12. A planar drive system having at least one control unit configured to execute a method according to claim 1, a stator module, a rotor and a magnetic field measuring arrangement, wherein:
the control unit is connected to the stator module via at least one data link, and
the stator module comprises a plurality of electrically energizable stator conductors for generating magnetic stator fields for electrically controlling the rotor;
wherein the rotor comprises a magnet arrangement for generating a magnetic rotor field,
wherein a magnetic coupling between the rotor and the stator module is achievable via the magnetic stator field and the magnetic rotor field,
wherein the stator module comprises a sensor module with a plurality of magnetic field sensors for determining a position of the rotor,
wherein the magnetic field sensors are arranged in a two-dimensional array on the stator module, and
wherein each magnetic field sensor is configured to determine the magnetic rotor field for a spatial area in the two-dimensional array.

* * * * *